US009106714B2

(12) United States Patent
Kumarasamy et al.

(10) Patent No.: US 9,106,714 B2
(45) Date of Patent: Aug. 11, 2015

(54) PLUG AND PLAY PROVISIONING OF VOICE OVER IP NETWORK DEVICES

(75) Inventors: Parameswaran Kumarasamy, San Jose, CA (US); Paul R. P. Chu, Saratoga, CA (US); Andrew W. Au, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1352 days.

(21) Appl. No.: 12/508,141

(22) Filed: Jul. 23, 2009

(65) Prior Publication Data

US 2011/0019660 A1 Jan. 27, 2011

(51) Int. Cl.
*G06F 15/16* (2006.01)
*H04L 29/08* (2006.01)
*H04L 29/12* (2006.01)
*H04L 29/06* (2006.01)

(52) U.S. Cl.
CPC ............ *H04L 67/34* (2013.01); *H04L 65/1059* (2013.01); *H04L 61/2015* (2013.01); *H04L 65/1006* (2013.01)

(58) Field of Classification Search
CPC . H04L 67/34; H04L 65/1059; H04L 65/1006; H04L 61/2015; H04M 7/006
USPC ........................................................ 709/227
See application file for complete search history.

(56) References Cited

U.S. PATENT DOCUMENTS

| 7,046,659 | B1 | 5/2006 | Woundy | |
|---|---|---|---|---|
| 7,778,404 | B2 | 8/2010 | Caballero-McCann et al. | |
| 2004/0213234 | A1* | 10/2004 | Koch et al. | 370/392 |
| 2005/0083911 | A1* | 4/2005 | Grabelsky et al. | 370/352 |
| 2007/0217408 | A1* | 9/2007 | Sahashi et al. | 370/389 |
| 2008/0084870 | A1* | 4/2008 | Taylor et al. | 370/352 |
| 2008/0279116 | A1* | 11/2008 | Tuffin et al. | 370/254 |
| 2009/0198797 | A1* | 8/2009 | Wang et al. | 709/220 |
| 2010/0030903 | A1* | 2/2010 | Li et al. | 709/228 |

OTHER PUBLICATIONS

Kawazoe, "Special Feature: NGN Communication Styles and Platform Application Technology Using the Next Generation Network", NTT Cyber Solutions Laboratories, NTT Technical Review, vol. 5, No. 6, Jun. 2007, pp. 1-9.
Open IPTV Forum—Release 1 Specification, vol. 4—Protocols, V1.0, Jan. 6, 2009, pp. 1-176.

* cited by examiner

*Primary Examiner* — John MacIlwinen
(74) *Attorney, Agent, or Firm* — Edell, Shapiro & Finnan, LLC

(57) ABSTRACT

Techniques are provided for sending from a client in a network device a request message configured to request configuration parameters to allow the network device to operate as a source or destination node for packet switched network telephony activity. In response to receiving the request message, sending the configuration parameters from a server configured to retrieve the configuration parameters from a call provisioning server. The configuration parameters are received at the client and passed to a call agent in the network device in order to configure the network device to operate as a source or destination node for packet switched network telephony activity.

18 Claims, 6 Drawing Sheets

PLUG AND PLAY PROVISIONING OF VOICE OVER IP NETWORK DEVICES

TECHNICAL FIELD

The present disclosure relates to network provisioning and more particularly to provisioning a device for voice over a packet switched network.

BACKGROUND

Voice over Internet Protocol (VoIP) has become an attractive alternative to the traditional land line service using a public switched telephone network (PSTN). VoIP is also referred to as Internet telephony, broadband telephony, or voice over broadband. Regardless of the term used, voice and/or video are digitized and transmitted over a packet switched network. Audio and video coders/decoders (codecs) may be employed to provide compression or to enable high fidelity stereo sound. To ensure real-time delivery of voice and video the packet data may be further encapsulated in a protocol that can provide a quality of service, e.g., real-time transport protocol (RTP) or secure real-time transport protocol (SRTP).

As with traditional PSTN services, phone calls must be set up when a number is dialed and torn down when a user hangs up the phone. In VoIP systems, various proprietary or open signaling protocols may be used, such as session initiation protocol (SIP), IP multimedia subsystem (IMS), H.323, or Skype. Before signaling can begin, however, the VoIP phone or terminal involved in the call needs to be provisioned. For example, when SIP is used, a SIP user agent (UA) is resident in each VoIP phone or device. The SIP UA needs certain information such as its phone number, its media access control (MAC) or IP address, the SIP server IP address, and the SIP domain name. In current VoIP systems, this information is provided to the SIP UA manually.

DESCRIPTION OF EXAMPLE EMBODIMENTS

Overview

Techniques are provided for sending from a client in a network device a request message configured to request configuration parameters to allow the network device to operate as a source or destination node for packet switched network telephony activity. In response to receiving the request message, sending the configuration parameters from a server configured to retrieve the configuration parameters from a call provisioning server. The configuration parameters are received at the client and passed to a call agent in the network device in order to configure the network device to operate as a source or destination node for packet switched network telephony activity.

Example Embodiments

Figure 1:
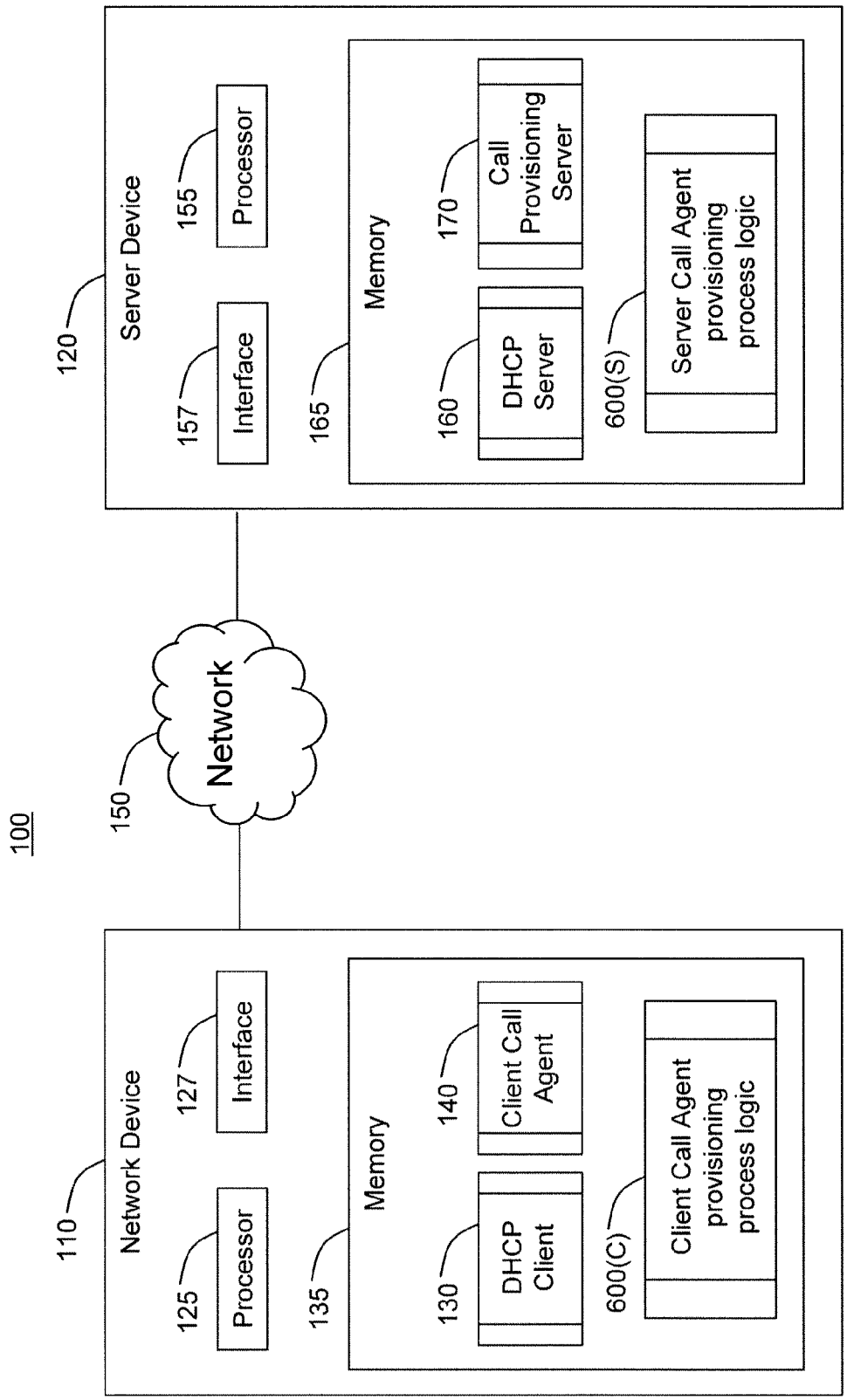
FIG. 1 is a block diagram showing an example of a network in which a network device and a server device communicating call provisioning information to each other.

Referring first to FIG. 1, a system 100 is shown. The system 100 comprises a network device 110 and a server device 120. Between the network device 110 and the server device 120 is a network 150 to allow the two devices to communicate. The network device 110 comprises a data processing device 125, an interface unit 127, and a memory 135. Resident in the memory 135 is software configured to execute a DHCP client 130, a CCA 140, and Client call agent provisioning process logic 600(C). The CCA provisioning process logic 600(C) is configured to provision the CCA 140.

The server device 120 comprises a data processing device 155, an interface unit 157, and a memory 165. Resident in the memory 165 is software configured to execute a DHCP server 160, a Call provisioning server 170, and SCA provisioning process logic 600(S). The SCA provisioning process logic 600(S) is configured to provide call provisioning information or parameters. The client process logic 600(C) and server process logic 600(S) will be referred to generally in conjunction with FIGS. 2-5, and described in detail in conjunction with FIG. 6. It is to be appreciated that the DHCP client 130 and the CCA 140 shown in connection with network device 110, and the DHCP server 160 and Call provisioning server 170 shown in connection with server device 120 may be software modules that may be instantiated in several devices and they need not reside together in any one device, respectively. Furthermore, the client process logic 600(C) may be implemented in a software module that is part of the DHCP client 130 and the server process logic 600(S) may be implemented in a software module that is part of the DHCP server 160. Instead of DHCP other protocols may be used, e.g., Web Proxy Autodiscovery Protocol (WPAD), Proxy auto-configuration (PAC), Automatic Private IP Addressing (APIPA), and for mobile VoIP devices, address autoconfiguration protocols (AAPs) may be used to retrieve provisioning information.

The data processing devices 125 and 155 may be microprocessors, microcontrollers, systems on a chip (SOCs), or other fixed or programmable logic. The memories 135 and 165 may be any form of random access memory (RAM) or other data storage block that stores data used for the techniques described herein. The memories 135, 165 may be separate or part of the processors 125, 155, respectively. Instructions for performing the client process logic 600(C) may be stored in the memory 135 for execution by the processor 125 and instructions for performing the server process logic 600(S) may be stored in the memory 165 for execution by the processor 155. The client process logic 600(C) generates requests for provisioning information, and passes the provisioning information to and/or provisions the CCA 140. The server process logic 600(S) retrieves the provisioning information requested by the client process logic 600(C), and sends the provisioning information back to the network device 110. The interface units 127 and 157 enable communication between the network device 110 and the server device 120, and ultimately to other network elements including the clients, agents, and servers in the system 100.

The functions of the processors 125 and 155 may be implemented by logic encoded in one or more tangible media (e.g., embedded logic such as an application specific integrated circuit (ASIC), digital signal processor (DSP) instructions, software that is executed by a processor, etc.), wherein the memories 135 and 165 store data used for the computations or functions described herein (and/or to store software or processor instructions that are executed to carry out the computations or functions described herein). Thus, the client process logic 600(C) and the server process logic 600(S) may be implemented with fixed logic or programmable logic (e.g., software or computer instructions executed by a processor or field programmable gate array (FPGA)).

The network device 110 and server device 120 may interface to a call manager as part of a call management system. Such a call manager is described hereinafter in conjunction with FIG. 4. The network device 110 and server device 120 may be a general purpose computer (e.g., a personal computer (PC)), a rack mounted computer, or other computer in a network or cluster. Alternatively, the network device 110 may be a SIP-enabled phone or SIP phone, or other packet switched telephony enabled terminal, such as an H.323 video teleconference terminal. The network device 110 may be coupled to a camera and/or a display monitor (not shown) for simultaneous transport of audio and video over network 150 or other network (not shown). The network device 110 and the server device 120 may run custom, proprietary, or commercial off-the-shelf applications that may be configured to implement the client process logic 600(C) and server process logic 600(S), respectively. For example, the process logic 600(C)/600(S) may be configured or activated via a graphical user interface by a user in a network monitoring or call control center, or help desk.

Figure 2:
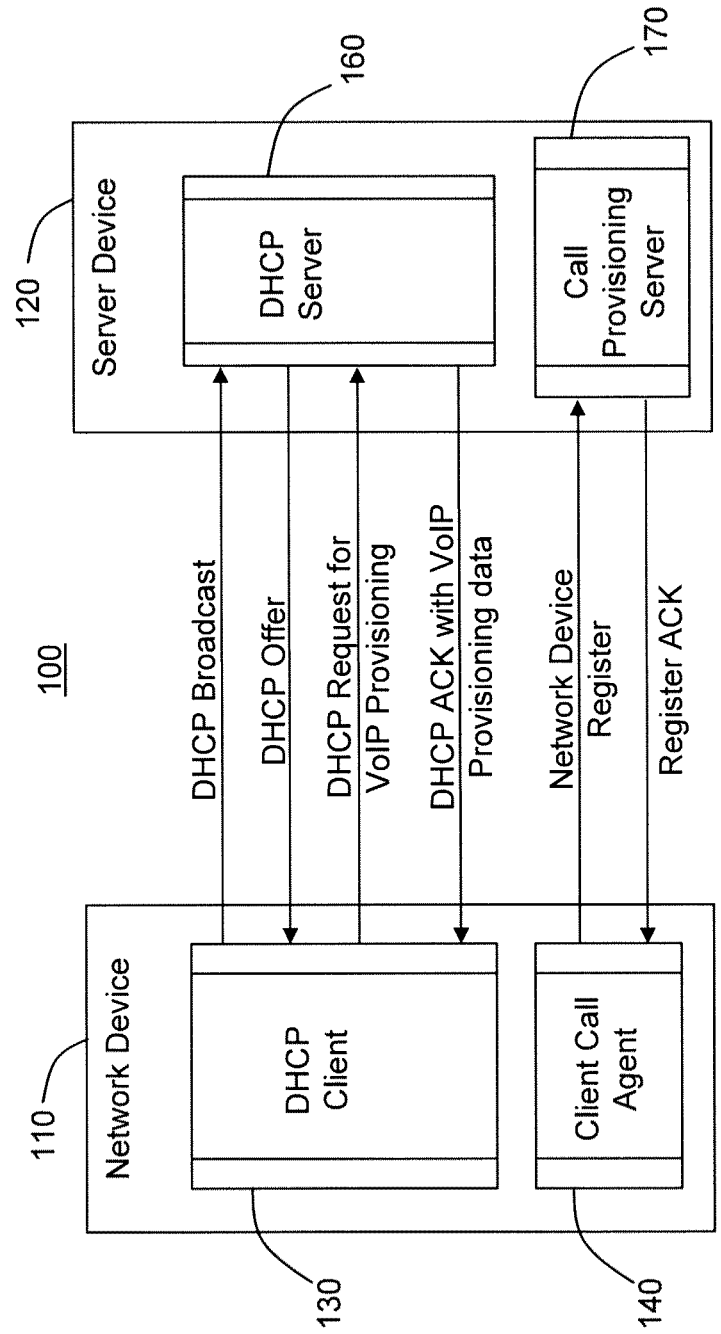
FIG. 2 is a block diagram showing the network device and the server device communicating dynamic host configuration protocol (DHCP) messages and Client-Server call agent messages.

Referring to FIG. 2, the exchange in messages between the network device 110 and the server device 120 is described. The network device 110 and the server device 120 are shown communicating DHCP messages and CCA messages. When the network device 110 first powers up, it must learn its IP address (which is provided via DHCP). As shown, the network device 110 broadcasts a normal DHCP discover message over the network 150 (the network 150 is not shown in FIG. 2) to the server device 120. After the normal authentication process, the DHCP server 160 responds to the DHCP discover message with a normal DHCP offer message that contains an IP address for the network device 110.

Also as part of the power up process, CCA 140 starts up and client process logic 600(C) becomes active. If client process logic 600(C) detects that the CCA 140 has not yet been provisioned, the DHCP client 130 queries the DHCP server 160 by sending a DHCP request message requesting provisioning information or configuration parameters for the CCA 140. In one example, the DHCP request message contains a request for the SIP server address and vendor-specific information. An example DHCP request message is shown in Listing 1 below with the routine elements omitted.

Listing 1.

Bootstrap Protocol
   Message type: Boot Request (1)
     ...
   Option 55: Parameter Request List
     120 = SIP Server DHCP Option
     125 = Vendor-identifying Vendor-Specific information Option
     ...
   Option 255 : End Option Listing 1 shows options 120 and 125 within the option 55 parameter request list using plain text format. These options indicate to the server process logic 600(S) that a SIP server IP address (option 120) and SIP UA provisioning information (option 125) are requested. The DHCP server 160 receives the DHCP request message. The server process logic 600(S) retrieves the requested configuration parameters and indicates to the DHCP server 160 to respond with a DHCP acknowledgement (ACK) message that contains the requested configuration parameters. An example DHCP ACK message is shown in Listing 2 below with the routine elements omitted.

Listing 2.

Bootstrap Protocol
   Message type: Boot Reply (2)
     ...
   Option 120: SIP server DHCP Option=<IP address of SIP Server>
   Option 125: Parameter Request List
     201: MAC Address = < Mac Address of Network device 110 >
     202: Phone Number = 03111111111
     203: Additional Phone Number = 0311112222
     204: SIP Domain Name = rt.cisco.com
     210: FQDN of UNI management server = < FQDN >
     211: Gatekeeper=<IP address>
     ...
   Option 255 : End Option Listing 2 shows the response to options 120 and 125 contained in the DHCP ACK in plain text format. The server process logic 600(S) has returned the SIP server IP address under option 120 and a number of user selectable or user configurable parameters under option 125. The types of user configurable parameters may also be set using a factory default or tied to a particular enterprise ID (described below). In this example, the MAC address of the network device 110 (option 201), phone number (option 202), an additional or secondary phone number (option 203), the SIP domain name (option 204), and a fully qualified domain name (FQDN) of a management server (option 210) has been provided in the DHCP ACK message. In one example, the phone number could be used for outside or inter-office communication and the additional phone number could be a local extension for an IP private branch exchange (IP-PBX) phone system used for intra-office communication, or vice versa.

Listing 1 and Listing 2 are formatted in plain text for readability. In actuality, the messages are sent as hexadecimal numbers according to a specific format. In this example, the DHCP ACK message contains a MAC address that can be used to verify authenticity of the information contained in the message. The fields in the message could be easily adapted, e.g., for H.323, signaling correction control part (SCCP), or other signaling protocol used for device provisioning. For example, Listing 2 has a placeholder for a Gatekeeper IP address (option 211) which may be used for H.323.

Continuing with reference to FIG. 2, the DHCP client 130 receives the DHCP acknowledgment message. The client process logic 600(C) extracts the provisioning information or configuration parameters and passes the configuration parameters to the CCA 140. The CCA 140 then provisions itself using the configuration parameters with no manual or user intervention required. In an alternate example the client process logic 600(C) provisions the CCA 140 directly, again without manual or user intervention. Once provisioned the CCA 140 registers the phone numbers with the Call provisioning server 170 via a network device register message (e.g., a SIP register message). If registration is successful, the Call provisioning server 170 acknowledges the network device register message (e.g., with a "200 OK" message). The network device 110 is then operable to dial (originate calls), answer calls, or hang up (terminate calls) using the CCA 140.

Figure 3:
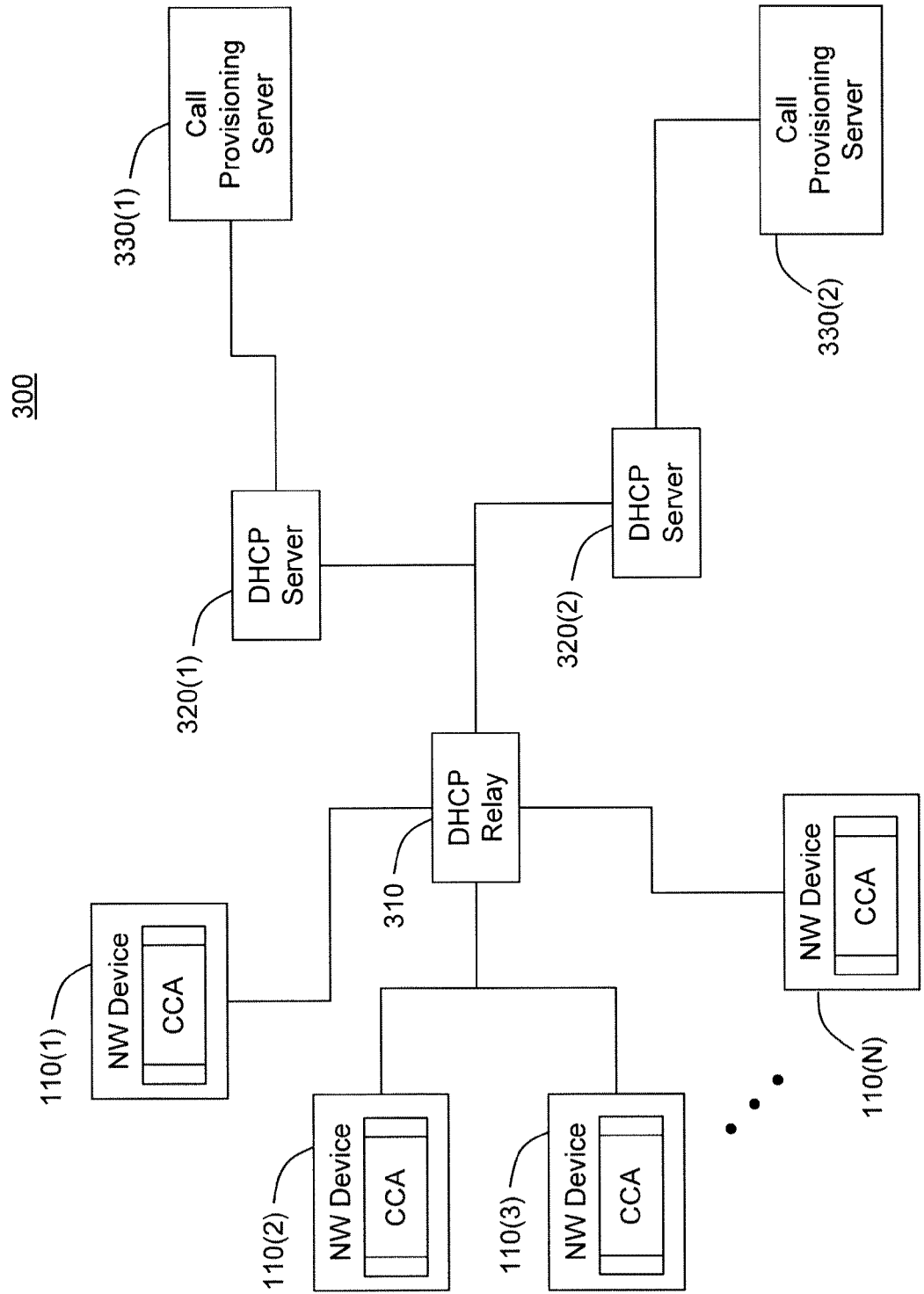
FIG. 3 is a block diagram showing an example of a network configuration with a plurality of network devices and server devices, whereby the network devices are provisioned via a DHCP relay.

Turning now to FIG. 3, a network 300 is shown. Network 300 comprises a plurality of network devices 110(1)-110(N) that are similar to network device 110 of FIG. 1, a plurality of DHCP servers 320(1)-320(2), a plurality of SIP servers 330(1)-330(2), and a DHCP relay 310 In this example, the DHCP relay 310 collects DHCP and call provisioning information for N client network devices, e.g., network devices 110(1)-110(N). This information may be collected during periods of low network utilization, i.e., when there is bandwidth availability. For example, there may be hundreds of DHCP client vying for unicast bandwidth with one of the DHCP servers 320(1)-320(2). The DHCP relay can act as a front end or proxy for the DHCP servers 320(1)-320(2), and thereby, the DHCP relay 310 is ready to immediately respond to multiple DHCP and provisioning requests from multiple clients.

Figure 4:
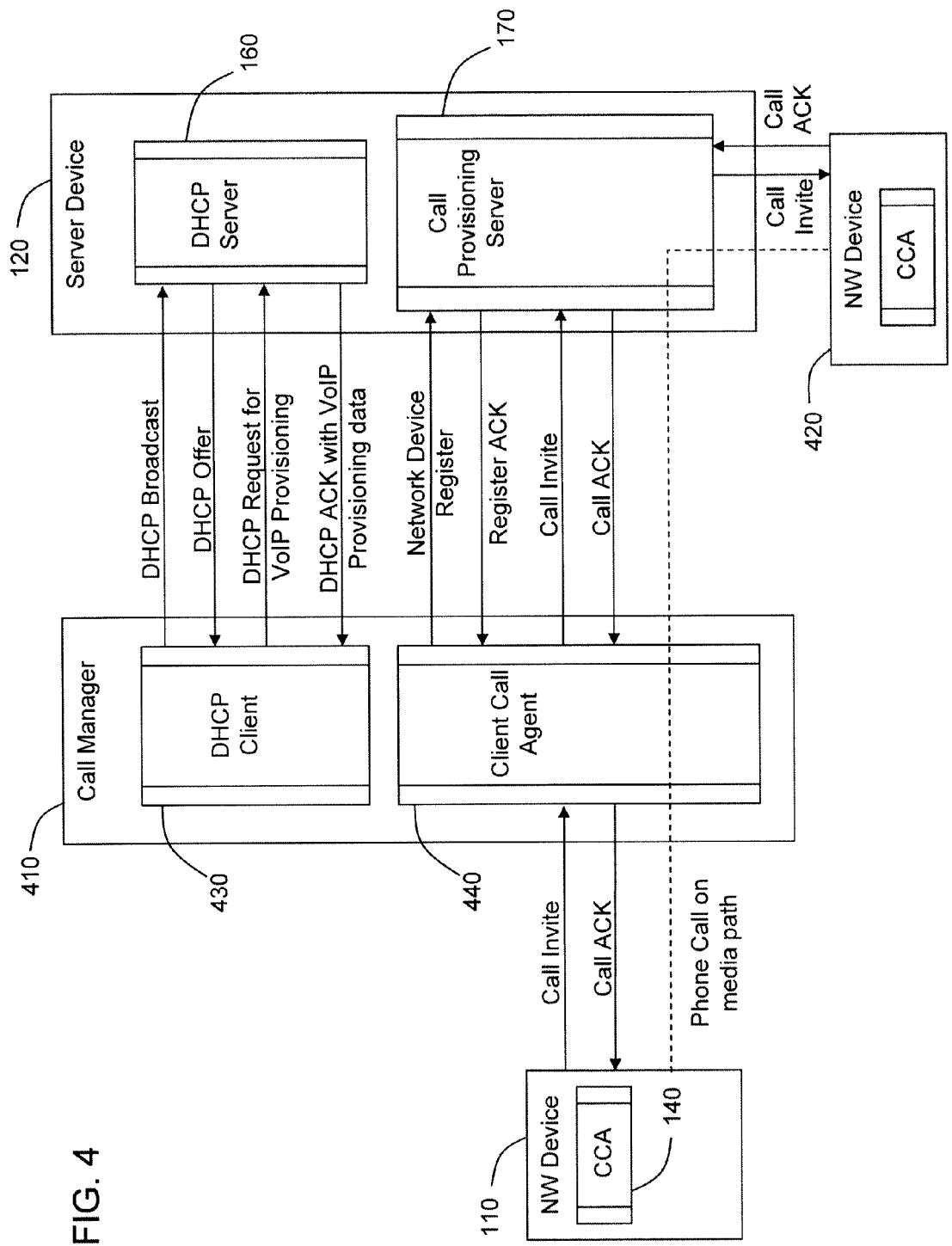
FIG. 4 is a block diagram showing an example of a network configuration with a call management device, whereby a network device is provisioned via the call management device.

Referring to FIG. 4, the network device 110 and the server device 120 from FIGS. 1 and 2 are shown along with a call manager 410 coupled between the network device 110 and the server device 120, and a remote network device 420. The call manager 410 may contain analogous or similar elements, components, or modules as network device 110, such as a data processing device, an interface unit, and a memory, each of which are not shown. Resident within the call manager 410 is a DHCP client 430 with client call agent provisioning process logic and a CCA 440. The DHCP client 430 is configured to collect information for provisioning CCA 140 and a plurality of other CCAs (not shown). The call manager 410 may also contain a DHCP relay, e.g., DHCP relay 310 shown in FIG. 3.

FIG. 4, like FIG. 2, shows the exchange of messages between the call manager 410 and the server device 120. The DHCP discover, DHCP offer, DHCP request, and DHCP ACK messages perform the same functions as described in conjunction with FIG. 2. However, unlike the system 100, call manager 410 cannot directly provision CCA 140. As depicted in FIG. 4, a user will need to login to the call manager 410 to retrieve the CCA provisioning information and configure CCA 140. Although the provisioning of CCA 140 as shown in FIG. 4 still requires some manual steps, this example embodiment has the advantage of having the CCA provisioning information readily available as opposed to having to call or email a service provider, wait, then verify the account information before obtaining the provisioning information. In another example the client provisioning process logic 430 or a DHCP relay resident within the call manager 410 is configured to automatically provision CCA 140 directly without manual intervention.

Once CCA 440 receives the provisioning information and CCA 140 is provisioned, CCA 440 registers CCA 140 with call provisioning server 170, i.e., CCA 440 acts as a proxy for CCA 140. If a user of network device 110 calls remote network device 420 then CCA 140 sends a call invite message to remote network device 420 via CCA 440 and Call provisioning server 170. If remote network device 420 accepts the call then a call ACK message is relayed back to CCA 140. At that point in time the phone call is set up and communications may commence between network device 110 and remote network device 420 as indicated by the dashed line in FIG. 4.

Figure 5:
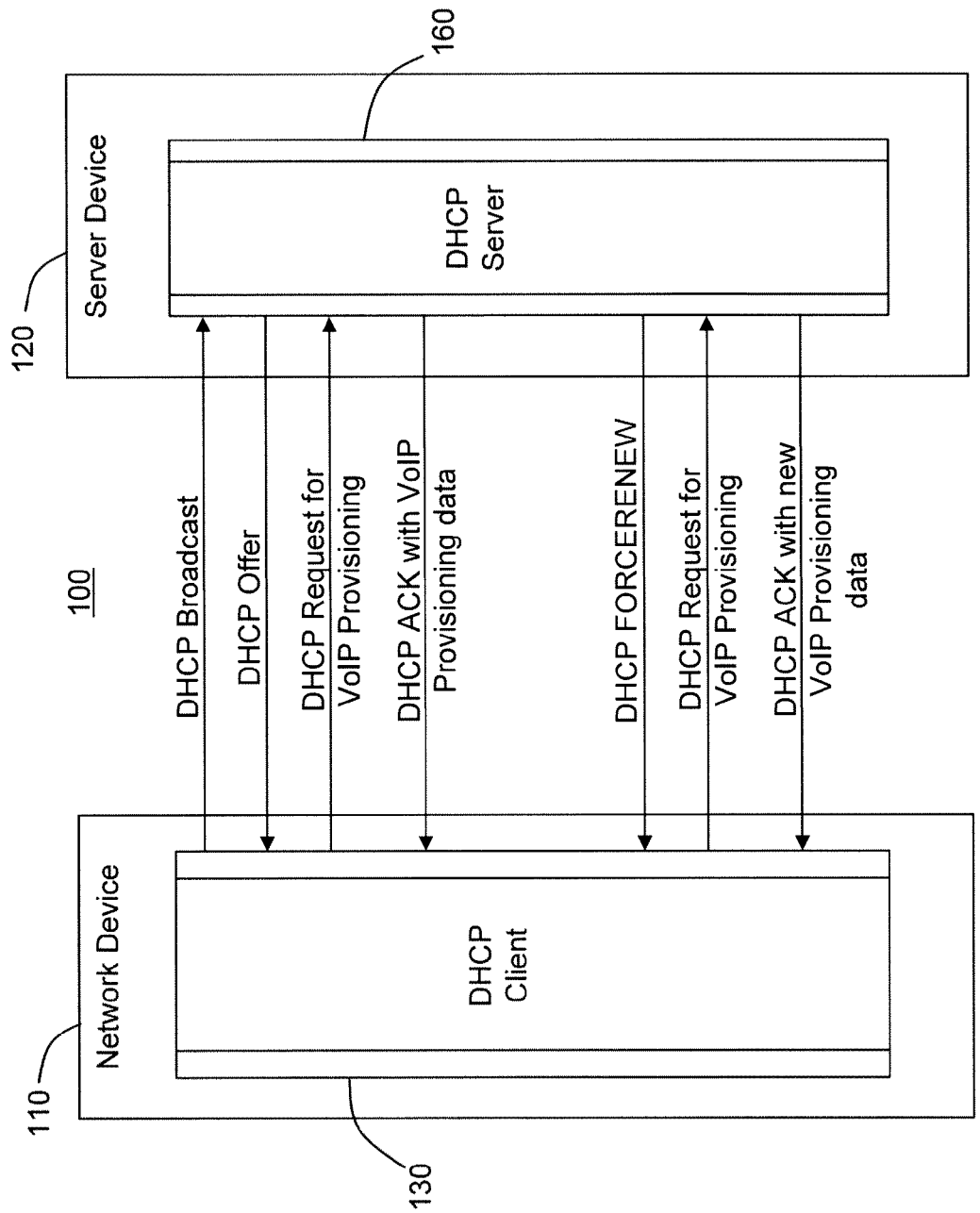
FIG. 5 is a block diagram showing the network device of FIG. 2 being reprovisioned by the server device.

Referring to FIG. 5, the system 100 from FIG. 2 is shown with additional DHCP messages exchanged between the DHCP client 130 and the DHCP server 160. The DHCP broadcast, DHCP offer, DHCP request, and DHCP ACK messages perform the same functions as those described above in connection with FIG. 2. In addition, a DHCP FORCERENEW message is sent from the DHCP server 160 to the DHCP client 130. The DHCP FORCERENEW message indicates to the client process logic 600(C) to immediately renew the CCA provisioning information for CCA 140 (not shown). Reprovisioning may be necessary, for example, when network topology has changed, if traffic load needs to be balanced across network devices and servers, when devices are upgraded, and for time-of-day traffic rerouting. DHCP client 130 sends the requisite DHCP request message with, e.g., options 220 and 125. The DHCP server 160 responds with the new provisioning information, e.g., VoIP provisioning information, for CCA 140. If reprovisioning is less urgent then a DHCP RENEW message may be sent instead of the DHCP FORCERENEW message.

Figure 6:
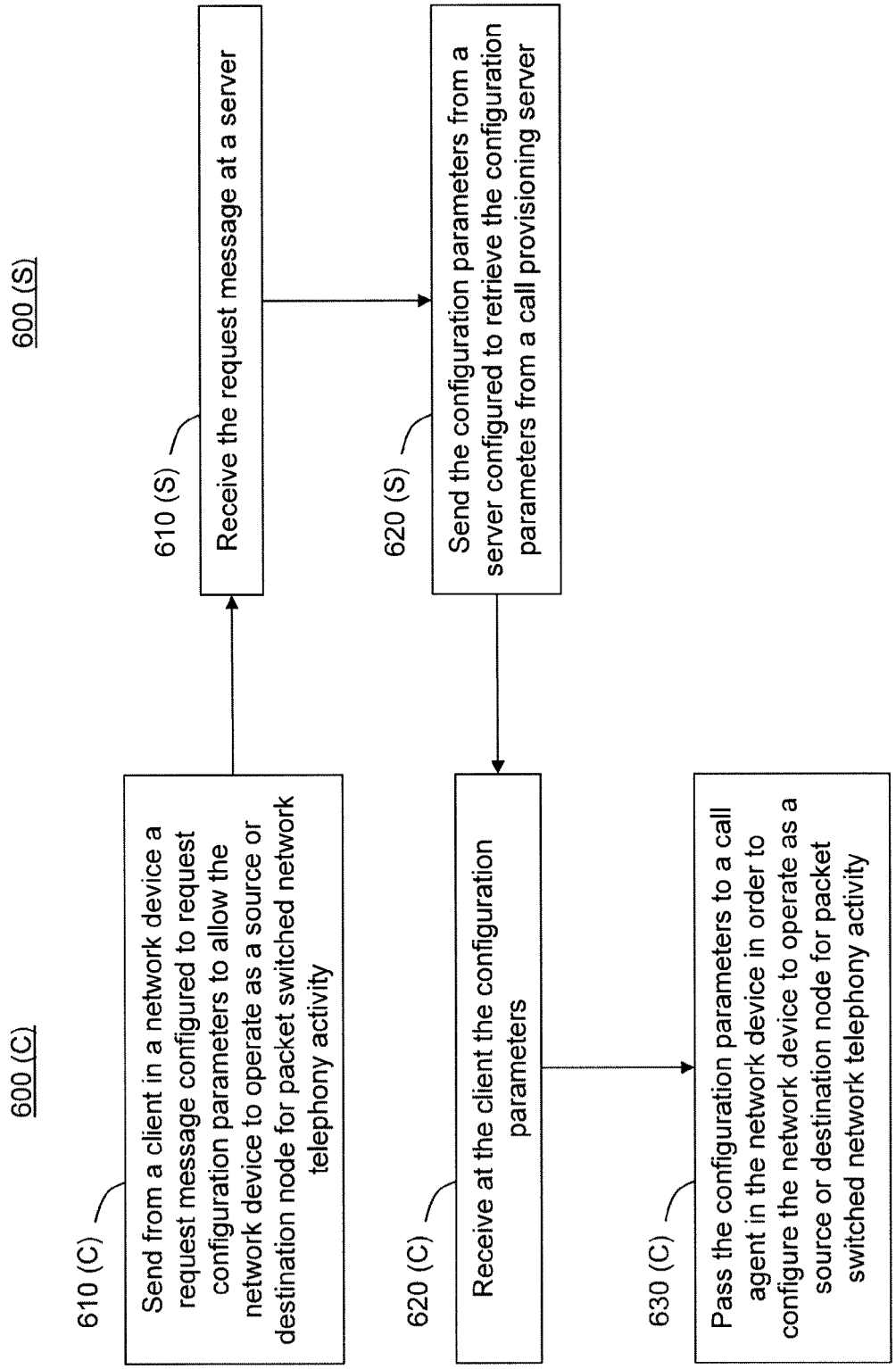
FIG. 6 is a flow chart generally depicting Client call agent (CCA) provisioning process logic and Server call agent (SCA) provisioning process logic.

Referring now to FIG. 6, a flow chart generally depicting the client process logic 600(C) and server process logic 600(S) is shown. Client process logic 600(C) logic comprises blocks 610(C), 620(C), and 630(C) that are executed by the network device 110. Server process logic 600(S) logic comprises blocks 610(S) and 620(S) that are executed by the server device 120.

At 610(C), a request message is sent from a client in a network device configured to request configuration parameters to allow the network device to operate as a source or destination node for packet switched network telephony activity. At 610(S) the request message is received by a server. In one example, the request message is a DHCP request message requesting vendor-specific information. The request may be made under DHCP option 55 (IP version 4) which is used to send a parameter request list to a DHCP server. In one example, option 125 is placed under DHCP option 55 and requests the vendor-specific information. A SIP server address may also be requested under option 120. For IP version 6, the OPTION_VENDOR_OPTS message along with the appropriate sub-options may be used. The vendor-specific information may be any information needed to provision the call agent for packet switched telephony using any suitable signaling protocol corresponding to the capabilities of the network device.

At 620(S), after receiving the request message the server responds by sending configuration parameters retrieved from a call provisioning server that allows the network device to operate as a source or destination node for packet switched network telephony activity. In one example, a DHCP ACK message returns the requested SIP server address under standard option 120. The server process logic 600(S) is also configured to return a specific user configurable set of vendor-specific parameters when option 125 is received in the DHCP request message. For example, the vendor-specific data sent under option 125 may be a MAC address, phone number, secondary phone number, SIP domain name, and the FQDN of the management server (i.e., options 201-204 and 210 as described above) or may be an H.323 gatekeeper address. The configuration parameters may be for any signaling protocol that allows the call agent to set up and/or terminate (tear down) a packet switched network phone call.

At 620(C), the configuration parameters are received at the client in the network device, and at 630(C), the configuration parameters are passed to a call agent in the network device using, e.g., a DHCP notify message, in order to configure the network device to operate as a source or destination node for packet switched network telephony activity. The call agent, e.g., a SIP UA, provisions itself using the configuration parameters and is now ready to participate in the packet switched network telephony activity. The packet switched network telephony activities may include VoIP phone calls, VoIP video calls, VoIP voice/video conference calls between two or more participants or terminal devices, and the like.

Embodiments described herein provide dynamic plug and play provisioning for telephony enabled network elements with no manual user intervention. These techniques are useful for household consumers, enterprise users, and service providers while maintaining standard network security methods. In this way, even a large network with several hundreds or thousands of devices can be easily managed with reduced down time and with reduced help desk resources. These techniques also help with network maintenance where a FORCERENEW message can be used to divert telephony traffic so that the network or devices can be upgraded or downgraded, and/or the phone numbering scheme or dial plan can be efficiently changed.

Although some embodiments are described herein with respect to SIP networks and devices, the methods are easily extensible to any general VoIP deployment for any configuration including any number of endpoints, gateways, servers, IP-PBXs, or back to back user agents. Other signaling protocols may be used, e.g., Skinny Call Control Protocol (SCCP), H.323, Integrated Services Digital Network (ISDN), or Media Gateway Control Protocol (MGCP). The signaling protocols may be used in conjunction with other protocols or standards for signaling and transport, e.g., H.225 (signaling), H.245 (control), Real-time Transport Protocol (RTP), T.120 (Cisco WebEx MeetingCenter, Microsoft NetMeeting), T.38 (facsimile), V.150 (modem over IP); H.261, H.263, and H.264 video codecs; G.711, G.723.1, and G.729 audio codecs; and the like. Authentication and accounting protocols may also be employed. For example, authentication, access control, and accounting (AAA) protocols such as Remote Authentication Dial In User Service (RADIUS)/Diameter or Terminal Access Controller Access-Control System (TACACS)+to ensure secure access and to provide billing information.

Techniques are provided herein for sending a DHCP request message from a DHCP client in a network device. In response to receiving the DHCP request message, a DHCP server sends configuration parameters to allow the network device to operate as a source/destination node for network activity. The configuration parameters are passed to a SIP user agent in the network device in order to configure the network device to operate as a source or destination node for network activity.

Although the apparatus, logic, and method are illustrated and described herein as embodied in one or more specific examples, it is nevertheless not intended to be limited to the details shown, since various modifications and structural changes may be made therein without departing from the scope of the apparatus, logic, and method and within the scope and range of equivalents of the claims. Accordingly, it is appropriate that the appended claims be construed broadly and in a manner consistent with the scope of the apparatus, logic, and method, as set forth in the following claims.

What is claimed is:

1. A method comprising:
sending from a network device client to a dynamic host configuration protocol (DHCP) network configuration server a DHCP request message configured to request call configuration parameters to allow the network device client to operate as a source node or destination node for packet switched network telephony activity, wherein the network configuration server is configured to provide network configuration parameters for the network device client to communicate over a packet switched network and to retrieve the call configuration parameters from a session initiation protocol (SIP) call provisioning server, and wherein the DHCP request message is configured to request vendor-specific information in order to provision a call agent for a corresponding signaling protocol;

receiving at the network device a response message including the call configuration parameters from the network configuration server, wherein the call configuration parameters include a first telephone number for inter-office communication and a second telephone number for intra-office communication, and wherein the call configuration parameters comprise SIP user agent provisioning information; and passing the call configuration parameters to the call agent in the network device client in order to configure the network device client to operate as the source node or the destination node for packet switched network telephony activity, wherein the call configuration parameters configure the network device client to receive inter-office communication via the first telephone number and to receive intra-office communication via the second telephone number; and provisioning the call agent using the SIP user agent provisioning information.

2. The method of claim 1, wherein receiving the response message comprises receiving a dynamic host configuration protocol (DHCP) acknowledgement message that allows the call agent to set up and terminate a packet switched network phone call.

3. The method of claim 1, wherein the packet switched network telephony activity comprises an exchange of data via an Internet protocol, for facsimile, voice, video, multimedia, and application data for transferring voice, video, and/or multimedia between applications on network devices.

4. The method of claim 1, further comprising:
receiving at the network device client a DHCP renew message requesting the call agent to be reprovisioned;
sending from the network device client another request message configured to request new call configuration parameters;
in response to receiving the other request message, sending the new call configuration parameters from the network configuration server;
receiving at the network device client the new call configuration parameters;
passing the new call configuration parameters to the call agent; and
reprovisioning the call agent using the new call configuration parameters.

5. The method of claim 1, further comprising:
collecting dynamic host configuration protocol (DHCP) and call agent provisioning information from a plurality of DHCP servers and call provisioning servers at a DHCP relay; and
responding to the request message from the DHCP relay.

6. The method of claim 1, wherein sending the request message comprises sending the request message from a call management device, receiving comprises receiving the call configuration parameters at the call management device, and further comprising provisioning the call agent via the call management device.

7. An apparatus comprising:
a processor;
an interface configured to enable communication over a network; and
a memory configured to store software instructions that when executed by the processor cause the processor to perform a call agent function and a client function, and instructions that, when executed by the processor, cause the processor to:
send a dynamic host configuration protocol (DHCP) request message from the client function to a DHCP network configuration server configured to request call configuration parameters, wherein the network configuration server is configured to provide network configuration parameters for the apparatus to communicate over a packet switched network and to retrieve the call configuration parameters from a session initiation protocol (SIP) call provisioning server, and wherein the DHCP request message is configured to request vendor-specific information in order to provision a call agent for a corresponding signaling protocol;

receive a response message to the request message from the network configuration server comprising the call configuration parameters, wherein the call configuration parameters include a first telephone number for inter-office communication and a second telephone number for intra-office communication, and wherein the call configuration parameters comprise SIP user agent provisioning information;

pass the call configuration parameters to the call agent in order to configure the apparatus to operate as a source node or a destination node for packet switched network telephony activity, wherein the call configuration parameters configure the apparatus to receive inter-office communication via the first telephone number and intra-office communication via the second telephone number; and provision the call agent using the SIP server address and SIP user agent provisioning information.

8. The apparatus of claim 7, wherein the memory further stores instructions that, when executed, cause the processor to receive the response message as a dynamic host configuration protocol (DHCP) acknowledgement message, and set up and terminate a packet switched network phone call using a signaling protocol via the call agent.

9. The apparatus of claim 7, wherein the memory further stores instructions that, when executed by the processor, cause the processor to facilitate the packet switched network telephony activity comprising an exchange of data via an Internet protocol, for facsimile, voice, video, multimedia, and application data for transferring voice, video, and/or multimedia between applications on network devices.

10. The apparatus of claim 7, wherein the memory further stores instructions that, when executed, cause the processor to:
  receive a dynamic host configuration protocol (DHCP) renew message requesting the call agent to be reprovisioned;
  send another request message configured to request new call configuration parameters;
  receive the new call configuration parameters;
  pass the new call configuration parameters to the call agent; and
  reprovision the call agent using the new call configuration parameters.

11. A system comprising the apparatus of claim 7, and further comprising a dynamic host configuration protocol (DHCP) relay configured to:
  collect DHCP provisioning information and call agent provisioning information from a plurality of DHCP servers and call provisioning servers; and
  respond to the request message.

12. A system comprising the apparatus of claim 7, and further comprising a call management device coupled between the server and the apparatus, wherein the call management device is configured to:
  send the request message;
  receive the call configuration parameters; and
  provision the call agent.

13. Logic encoded in one or more storage devices for execution and when executed operable to:
  send from a client in a network device a dynamic host configuration protocol (DHCP) request message to a DHCP network configuration server configured to request call configuration parameters to allow the network device to operate as a source or destination node for packet switched network telephony activity, wherein the network configuration server is configured to provide network configuration parameters for the network device to communicate over a packet switched network and to retrieve the call configuration parameters from a session initiation protocol (SIP) call provisioning server, and wherein the DHCP request message is configured to request vendor-specific information in order to provision a call agent in the network device for a corresponding signaling protocol;
  receive a response message from the server at the client in the network device, wherein the response message comprises the call configuration parameters from the network configuration server, wherein the call configuration parameters include a first telephone number for inter-office communication and a second telephone number for intra-office communication, and wherein the call configuration parameters comprise SIP user agent provisioning information; and
  pass the call configuration parameters to the call agent in the network device in order to configure the network device to operate as a source node or a destination node for packet switched network telephony activity, wherein the call configuration parameters configure the network device to receive inter-office communication via the first telephone number and receive intra-office communication via the second telephone number.

14. The logic of claim 13, wherein the logic that receives comprises logic configured to receive the response message as a dynamic host configuration protocol (DHCP) acknowledgement message, and receive the call configuration parameters for a signaling protocol that allows the call agent to set up and/or terminate a packet switched network phone call.

15. The logic of claim 13, further comprising logic configured to exchange data via an Internet protocol, for facsimile, voice, video, multimedia, and application data for transferring voice, video, and/or multimedia between applications on network devices via a packet switched network phone call.

16. The logic of claim 13, further comprising logic configured to:
  receive a dynamic host configuration protocol (DHCP) renew message requesting the call agent to be reprovisioned;
  send another request message configured to request new call configuration parameters;
  receive the new call configuration parameters;
  pass the new call configuration parameters to the call agent; and
  reprovision the call agent using the new call configuration parameters.

17. The logic of claim 13, further comprising logic configured to:
  collect dynamic host configuration protocol (DHCP) provisioning information and call agent provisioning information from a plurality of DHCP servers and call provisioning servers; and
  respond to the request message.

18. The logic of claim 13, further comprising logic configured to:
   send the request message;
   receive the call configuration parameters; and
   provision the call agent.

\* \* \* \* \*